(12) United States Patent
Hallin

(10) Patent No.: US 11,788,775 B2
(45) Date of Patent: Oct. 17, 2023

(54) HEAT DISTRIBUTION DEVICE

(71) Applicant: HEATAMP SWEDEN AB, Stockholm (SE)

(72) Inventor: Ingemar Hallin, Lidingo (SE)

(73) Assignee: HEATAMP SWEDEN AB, Stockholm (SE)

( * ) Notice: Subject to any disclaimer, the term of this patent is extended or adjusted under 35 U.S.C. 154(b) by 222 days.

(21) Appl. No.: 17/420,930

(22) PCT Filed: Jan. 16, 2020

(86) PCT No.: PCT/EP2020/050962
§ 371 (c)(1),
(2) Date: Jul. 6, 2021

(87) PCT Pub. No.: WO2020/148360
PCT Pub. Date: Jul. 23, 2020

(65) Prior Publication Data
US 2022/0074602 A1 Mar. 10, 2022

(30) Foreign Application Priority Data
Jan. 18, 2019 (SE) ................................. 1950065-1

(51) Int. Cl.
*F25D 17/08* (2006.01)
*F24D 11/02* (2006.01)
(Continued)

(52) U.S. Cl.
CPC .......... *F25B 17/08* (2013.01); *F24D 11/0228* (2013.01); *F24H 1/188* (2013.01);
(Continued)

(58) Field of Classification Search
CPC .......... F25B 17/08; F25B 35/04; F25B 37/00; F24H 4/00–04
See application file for complete search history.

(56) References Cited

U.S. PATENT DOCUMENTS 4,748,830 A * 6/1988 Oouchi ................... F25B 37/00
62/476
9,752,797 B2 * 9/2017 Roetker .................... F24H 4/04
(Continued)

FOREIGN PATENT DOCUMENTS

DE 2648855 4/1978
DE 3519086 12/1986
(Continued)

OTHER PUBLICATIONS

International Preliminary Report on Patentability for PCT Application No. PCT/EP2020/050962 dated Jul. 29, 2021.
(Continued)

*Primary Examiner* — Christopher R Zerphey
(74) *Attorney, Agent, or Firm* — Branch Partners PLLC; Bruce E. Black

(57) ABSTRACT

There is disclosed a heat-transferring device comprising a buffer tank (1), a reactor vessel (2) in thermal contact with the buffer tank, wherein an active substance is held inside the reactor vessel, a burner (A), a reactor heating loop adapted to transfer heat from the burner to the active substance in the reactor vessel, a reactor cooling loop adapted to transfer heat from the active substance in the reactor vessel to the buffer tank, a volatile liquid reservoir (14) in fluid contact with the reactor vessel, an evaporator (15) in fluid contact with the volatile liquid reservoir, a volatile liquid in the volatile liquid reservoir, with the ability to be absorbed by the active substance at a first temperature and desorbed by the active substance at a higher temperature, an exhaust gas pipe (10,11,12) from the burner to the volatile liquid reservoir to heat it.

15 Claims, 3 Drawing Sheets

(51) Int. Cl.
    *F24H 1/18*     (2022.01)
    *F24H 1/20*     (2022.01)
    *F24H 4/04*     (2006.01)
    *F25B 37/00*     (2006.01)
    *F28D 20/00*     (2006.01)
    *F25B 47/02*     (2006.01)
    *F25B 17/08*     (2006.01)

(52) U.S. Cl.
    CPC ............... *F24H 1/205* (2013.01); *F24H 4/04* (2013.01); *F25B 37/00* (2013.01); *F28D 20/003* (2013.01); *F25B 47/027* (2013.01); *Y02B 30/62* (2013.01)

(56) References Cited

U.S. PATENT DOCUMENTS

| | | |
|---|---|---|
| 2010/0205981 A1 | 8/2010 | Bolin et al. |
| 2016/0231021 A1 | 8/2016 | Roetker |

FOREIGN PATENT DOCUMENTS

| | | |
|---|---|---|
| DE | 9311514 U | 9/1993 |
| JP | H09133432 | 5/1997 |
| WO | 2005/054757 | 6/2005 |
| WO | 2007/139476 | 12/2007 |
| WO | 2009/102271 | 8/2009 |
| WO | 2010/129949 | 11/2010 |
| WO | 2012/118437 | 9/2012 |
| WO | 2015/053764 | 4/2015 |
| WO | 2015/053767 | 4/2015 |
| WO | 2016/012436 | 1/2016 |
| WO | 2017/207262 | 12/2017 |

OTHER PUBLICATIONS

International Search Report and Written Opinion for PCT Application No. PCT/EP2020/050962 dated Apr. 1, 2020.

* cited by examiner

HEAT DISTRIBUTION DEVICE

CROSS-REFERENCE TO RELATED APPLICATIONS

This present application is a U.S. national stage application of PCT Application No. PCT/EP2020/050962, filed Jan. 16, 2020, which claims priority to Swedish Patent Application No. 1950065-1 filed Jan. 18, 2019, both of which are hereby incorporated by reference in their entirety.

TECHNICAL FIELD

The present invention relates generally to a heat distribution device with an integrated chemical heat pump. The device burns fuel and can provide heat which is useful for instance for domestic hot water and space heating.

BACKGROUND

Heat sorption pumps are used in various heating systems today and their use will increase primarily due to cost reasons because of their ability to reduce energy consumption. Additionally, but not least this will have a positive environmental impact since reduction of energy consumption most often means reduced $CO_2$ emissions.

In order for sorption heat pumps to be profitable, they need to be simple, robust, highly efficient, affordable and easy to integrate with energy storage. In addition, such sorption heat pumps must also be easily integrated into the relevant heating and cooling appliances already on the market today.

Many sorption machines work according to a batch process, which means that they work intermittently. These sorption machines usually consist of two main components: a reactor and a part that acts as a condenser or evaporator depending on the phase of the process. In these types of machines, there are two well-defined phases: charging and discharging. During the charging phase, the reactor takes in heat at high temperature and the condenser releases heat at lower temperatures. During the discharging phase, the reactor releases heat at low relatively temperatures and the evaporator absorbs heat at much lower temperatures (i.e. cooling).

The two phases are strongly based on heat exchange with the surrounding. Additionally, since the absorption machine works intermittently, the reactor needs heat in one phase and in the following phase it releases heat. The same occurs with the condenser/evaporator but conversely.

WO 2005/054757 discloses an installation for storing and/or transporting energy comprises a charging station, a discharging station and a reactor part. The reactor part is designed to be part of a chemical heat pump and contains an active substance.

WO 2007/139476 discloses a chemical heat pump with a reactor part and an evaporator/condenser part that contains that portion of volatile liquid that exists in a condensed state and can be absorbed by the active substance. In at least the reactor part, a matrix is provided for the active substance so that the active substance in both its solid state and its liquid state or its solution phase is held or carried by or bonded to the matrix.

WO 2009/102271 discloses a chemical heat pump using a hybrid substance and a volatile liquid comprising layers of a matrix material provided for binding or containing the substance and/or the condensed volatile liquid. These matrix layers are placed so that transport of heat to or from an external medium at least the free surfaces of the matrix layers is obtained.

WO 2012/118437 discloses a salt or CaO coated with hydrophobic nanoparticles. There is an inner part and an outer coating, forming a particle with a permeable membrane keeping liquid inside and letting gas pass. Said inner part comprises at least one selected from a salt and CaO and said outer coating comprises hydrophobic nanoparticles.

WO 2017/207262 discloses a heat-transferring device comprising a number of spaces and conduits together with heat-transferring elements and a heat exchanger as well as a heat source. A capillary tube feeds a heat-transferring medium to a space from which is can be evaporated.

WO 2015/053764 and WO 2015/053767 both disclose a water heater with a sorption-based reactor integrated into a water tank. The reactor is operated between an adsorption cycle and a desorption cycle. There is disclosed a space in contact with a heat source. A medium evaporates from that space.

DE 3519086 discloses a combination of a heating boiler with a zeolite/water adsorption apparatus in such a manner that the heat content of the smoke gases can be used far below the temperature level of the heating water and additionally ambient heat can be transformed up and useful cold extracted.

In the prior art it is always a desired to improve the overall efficiency.

At the same time, it is desirable to provide a simple and efficient way to provide defrosting, a boost function, stratification of heat, and to minimize the manufacturing cost of the device.

SUMMARY

It is an object of the present invention to obviate at least some of the disadvantages in the prior art and to provide an improved heat-transferring device with an integrated chemical heat pump with an improved efficiency.

In a first aspect there is provided a heat-transferring device comprising:
a buffer tank (1),
a reactor vessel (2) in thermal contact with the buffer tank (1), wherein an active substance is held inside the reactor vessel (2),
a burner (A),
a reactor heating loop adapted to transfer heat from the burner (A) to the active substance in the reactor vessel (2),
a reactor cooling loop adapted to transfer heat from the active substance in the reactor vessel (2) to the buffer tank (1),
a volatile liquid reservoir (14) in fluid contact with the reactor vessel (2),
an evaporator (15) in fluid contact with the volatile liquid reservoir (14),
a volatile liquid in the enclosed space formed by the reactor vessel (2), the volatile liquid reservoir (14), and the evaporator (15), the volatile liquid is selected together with the active substance so that the volatile liquid has the ability to be absorbed by the active substance at a first temperature and the ability to be desorbed by the active substance at a second higher temperature,
an exhaust gas pipe (10, 11, 12) leading from the burner (A) to a first space at least partially surrounding the volatile liquid reservoir (14) adapted so that heat can be transferred from burner exhaust gas in the first space to the volatile liquid reservoir (14).

a reactor heat exchanger (3) inside the reactor vessel (2), the reactor heat exchanger (3) having an inside and an outside, wherein the active substance is at least partially applied on the outside of the reactor heat exchanger (3), the reactor heating loop comprises a boiler (4) at least partially surrounding the burner (A), a boiler conduit (5, 16) leads from the boiler (4) to the inside of the reactor heat exchanger (3), which is in thermal contact with the active substance applied on the outside of the reactor heat exchanger (3), a burner fluid supply tube (9) leading from the inside of the reactor heat exchanger (3) to the boiler (4), and a communication pipe (8) leading from the burner fluid supply tube (9) to the buffer tank (1), the reactor cooling loop comprises a reactor cooling inlet pipe (7) leading from the buffer tank (1) via a pump (B) and a valve (E) to the inside of the reactor heat exchanger (3), and the communication pipe (8) leading from the burner fluid supply tube (9) to the buffer tank (1), wherein the enclosed space formed by the buffer tank (1), the boiler (4), the boiler conduit (5, 16), the inside of the reactor heat exchanger (3), a boost pipe (6), the reactor cooling inlet pipe (7), the communication pipe (8), the burner fluid supply tube (9) is at least partially filled with a heat-transferring fluid, the exhaust gas pipe (10, 11, 12) is at least partially in thermal contact with the buffer tank (1).

In a second aspect there is provided a method of operating the heat-transferring device as described above, wherein the device is operated in one of the following phases a) desorption phase wherein the burner heats the active substance via the reactor heating loop causing the volatile liquid to desorb from the active substance, the volatile liquid at least partially condensates on the walls of the reactor vessel (2) thereby heating the buffer tank (1) and the volatile liquid flows by gravity to the volatile liquid reservoir (14), and the evaporator (15), exhaust gas from the burner (A) reaches a first space at least partially surrounding the volatile liquid reservoir (14), where it provides heat counteracting condensation in the volatile liquid reservoir (14), b) adsorption phase wherein the burner is off, wherein the volatile liquid evaporates from the evaporator (15) and reaches the active substance in the reactor vessel (2) whereby heat is generated, whereby heat is transferred by the reactor cooling loop from the active substance to the buffer tank (1).

Advantages of the invention include that the heat in the exhaust gas can be utilized better, this gives a better overall efficiency.

The efficiency is further improved by letting the exhaust gases counteract and decrease condensation of volatile liquid in the reservoir (14) and instead promoting condensation where there is a thermal contact with the buffer tank (1) so that more heat can be transferred to the buffer tank from the condensation.

The overall efficiency is also improved since the mass changing temperature is minimized. Only the mass inside the reactor vessel (2) such as for instance the reactor heat exchanger (3) changes temperature drastically during the operation. Thereby the thermal mass loss is minimized improving the overall performance.

There is the possibility of using exhaust gases for defrosting of the evaporator (15) which makes the device more efficient by not having to switch off the chemical heat pump for defrosting and by not having to defrost with for instance an energy consuming electrical defroster.

There is the possibility of having the reactor vessel (2) inside the buffer tank (1) minimizing energy losses. Further, the placement of the reactor vessel (2) inside the buffer tank (1) reduces the pressure difference between the reactor vessel (2) and its surroundings since both the reactor vessel (2) and the buffer tank (1) typically are pressurized. This allows a less expensive construction of the reactor vessel (2). At the same time, the pressure in the buffer tank (1) is relatively constant not least due to an expansion vessel (F) so that the stress exerted on the material is lower compared to a tank with a heavily fluctuating pressure.

Regular plumbing components can be used when building the apparatus making it less expensive to manufacture and suitable to manufacture in large numbers.

There is the possibility of obtaining a stratification of the heat in the buffer tank (1) which has a number of advantages so that heat of different desired temperatures can be obtained for various needs.

BRIEF DESCRIPTION OF THE DRAWINGS

The invention is described, by way of example, with reference to the accompanying drawings, in which:

FIG. 1 shows an embodiment, of a heat-transferring device during desorption phase where the burner (A) is switched on.

FIG. 2 shows the same embodiment, as in FIG. 1 during boost and/or defrost mode where the burner (A) is switched on.

DETAILED DESCRIPTION

Figure 1:
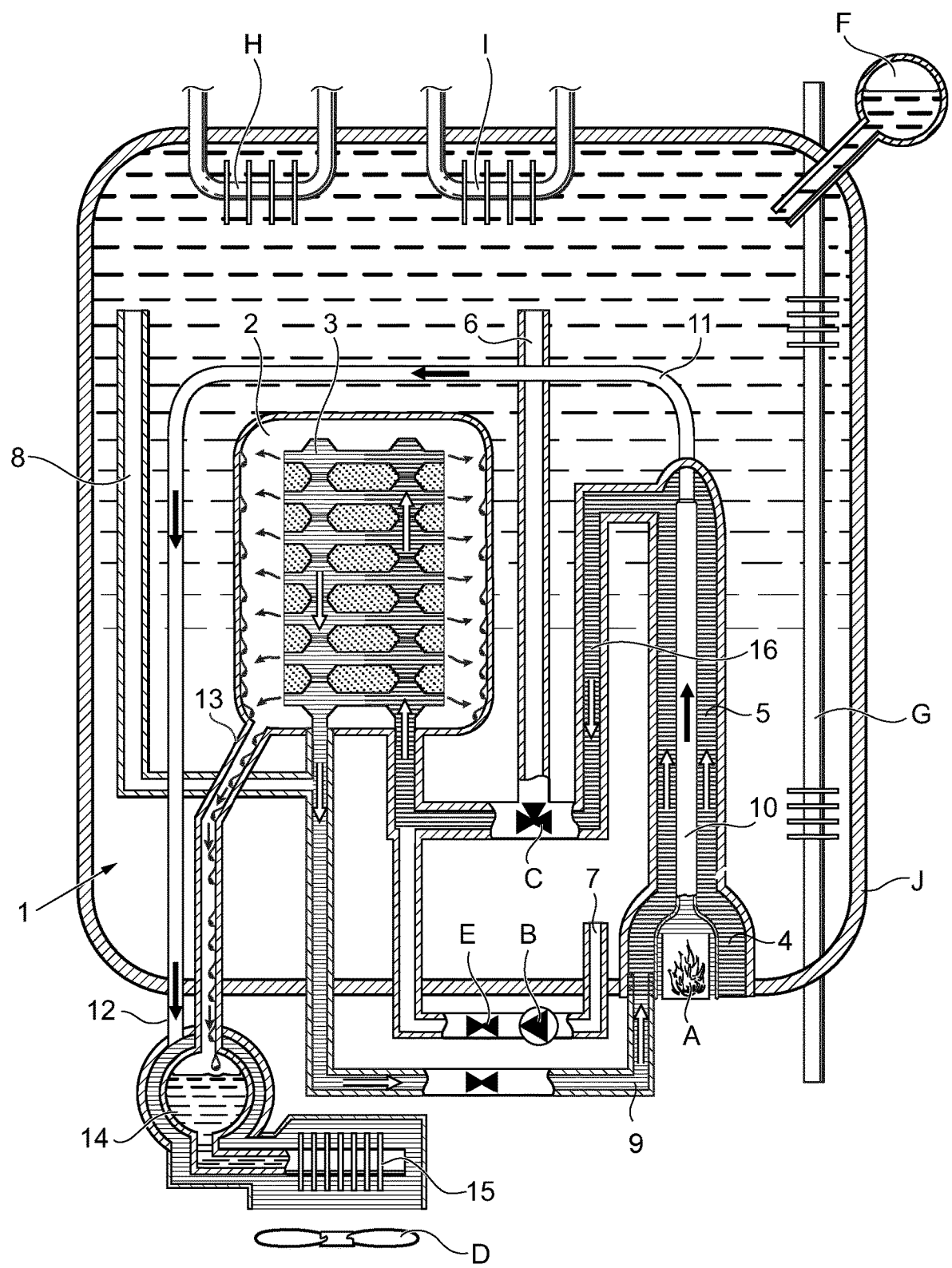

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term conduit as used throughout the description and the claims denotes a pipe or a tube through which a fluid is conveyed. In one embodiment, conduit denotes a pipe or a tube between two spaces so that there is fluid contact between the spaces. In an alternative embodiment, the two spaces are positioned at least partially adjacent to each other and the conduit is an opening giving a fluid contact between the spaces. Such an opening between two adjacent spaces is also considered to be encompassed by the term conduit.

Unless nothing else is clearly indicated, the term lower refers to the direction in relation to the gravitational force when the device is placed in a position intended for operation.

In a first aspect there is provided a heat-transferring device comprising:
- a buffer tank (1),
- a reactor vessel (2) in thermal contact with the buffer tank (1), wherein an active substance is held inside the reactor vessel (2),
- a burner (A),
- a reactor heating loop adapted to transfer heat from the burner (A) to the active substance in the reactor vessel (2),
- a reactor cooling loop adapted to transfer heat from the active substance in the reactor vessel (2) to the buffer tank (1),
- a volatile liquid reservoir (14) in fluid contact with the reactor vessel (2),
- an evaporator (15) in fluid contact with the volatile liquid reservoir (14),
- a volatile liquid in the enclosed space formed by the reactor vessel (2), the volatile liquid reservoir (14), and the evaporator (15), the volatile liquid is selected together with the active substance so that the volatile liquid has the ability to be absorbed by the active substance at a first temperature and the ability to be desorbed by the active substance at a second higher temperature,
- an exhaust gas pipe (10, 11, 12) leading from the burner (A) to a first space at least partially surrounding the volatile liquid reservoir (14) adapted so that heat can be transferred from burner exhaust gas in the first space to the volatile liquid reservoir (14).
- a reactor heat exchanger (3) inside the reactor vessel (2), the reactor heat exchanger (3) having an inside and an outside, wherein the active substance is at least partially applied on the outside of the reactor heat exchanger (3),
- the reactor heating loop comprises a boiler (4) at least partially surrounding the burner (A), a boiler conduit (5, 16) leads from the boiler (4) to the inside of the reactor heat exchanger (3), which is in thermal contact with the active substance applied on the outside of the reactor heat exchanger (3), a burner fluid supply tube (9) leading from the inside of the reactor heat exchanger (3) to the boiler (4), and a communication pipe (8) leading from the burner fluid supply tube (9) to the buffer tank (1),
- the reactor cooling loop comprises a reactor cooling inlet pipe (7) leading from the buffer tank (1) via a pump (B) and a valve (E) to the inside of the reactor heat exchanger (3), and the communication pipe (8) leading from the burner fluid supply tube (9) to the buffer tank (1),
- wherein the enclosed space formed by the buffer tank (1), the boiler (4), the boiler conduit (5, 16), the inside of the reactor heat exchanger (3), a boost pipe (6), the reactor cooling inlet pipe (7), the communication pipe (8), the burner fluid supply tube (9) is at least partially filled with a heat-transferring fluid,
- the exhaust gas pipe (10, 11, 12) is at least partially in thermal contact with the buffer tank (1).

The exhausts from the fire in the burner (A) are utilized better since they heat the volatile liquid reservoir (14) and are cooled down more compared to any existing heater without a built in heat pump.

The heat transferring device can be seen as a system including the active substance and the necessary liquids.

The active substance is held inside the reactor vessel (2) in one or another way so that it cannot escape from the reactor vessel (2). The active substance is in one embodiment, fixed to a surface inside the reactor vessel (2). In another embodiment, the active substance is held by a matrix and in an alternative substance the active substance is provided in the form of particles coated by nanoparticles.

The active substance works together with the volatile liquid as in chemical heat pumps working according to the absorption principle, i.e. the volatile liquid is absorbed by the active substance at a first temperature. At a second higher temperature the volatile liquid is desorbed from the active substance, which is referred to as desorption.

For the first space at least partially surrounding the volatile liquid reservoir (14), it is conceived that a gas in the first space is in thermal contact with volatile liquid in the volatile liquid reservoir (14) so that heat can be transferred from exhaust gas in the first space to the volatile liquid. This can be arranged for instance by having a wall of the volatile liquid reservoir (14) which is thermally conducting.

The volatile liquid reservoir (14) is in fluid contact with the evaporator (15). The evaporator (15) is the part where heat from the surrounding can be transferred to the evaporator (15) and the volatile liquid inside the evaporator (15). Heat is transferred inside the evaporator (15) and volatile liquid reservoir (14) by circulation and convection of the volatile liquid. Thereby heat can be transferred also to volatile liquid in the volatile liquid reservoir (14) when the volatile liquid evaporates during absorption phase.

When the device is used with ambient air surrounding the evaporator (15) the temperature can become so low that humidity in the air condenses and sometimes also freezes to ice on the outside of the evaporator (15). Thus, some kind of defrosting may be necessary. In one embodiment, the exhaust gas pipe (10, 11, 12) leads further to a second space at least partially surrounding the evaporator (15) so that heat can be transferred from burner exhaust gas in the second space surrounding the evaporator (15). This embodiment, allows for instance defrosting of the evaporator (15) by using heat of the exhausts from the burner (A). In comparison with a standard heat pump the cycle does not have to be interrupted for defrosting and further the heat in the exhaust gas is utilized for defrosting giving even better use of the heat. The temperature of the exhaust gas can be lowered considerably thereby utilizing an improved fraction of the heat in the exhaust gas.

In one embodiment the exhaust gas pipe (10, 11, 12) is in thermal contact with a brine circuit, said brine circuit is further in thermal contact with surrounding air and the evaporator (15). In one embodiment the brine circuit comprises a heat transferring fluid and a pump. In one embodiment the brine circuit and the exhaust gas pipe (10, 11, 12) are in thermal contact a point after the first space at least partially surrounding the volatile liquid reservoir (14). The brine circuit is able to transfer heat from exhaust gas in the exhaust gas pipe (10, 11, 12) to the evaporator (15) and the area where the brine circuit is in thermal contact with surrounding air. The area where the brine circuit is in thermal contact with surrounding air is prone to formation of frost and ice during normal operating conditions and can thus be heated to be defrosted. In an embodiment with a brine circuit the evaporator (15) is normally not in direct contact with surrounding air and is instead in thermal contact with surrounding air via the brine circuit.

In one embodiment, a part of the exhaust gas pipe (11) is in thermal contact with the buffer tank (1) in an upper half of the buffer tank (1). This facilitates heat transfer from the hot exhaust gases to the heat-transfer liquid in the buffer tank (1) and improves stratification of the heat in the buffer tank (1).

It is conceived that in this embodiment, the reactor heating loop is a loop from the burner (A) to the inside of the reactor heat exchanger (3) formed by the boiler (4), the boiler conduit (5, 16), and the burner fluid supply tube (9). Further, the communication pipe (8) is also a part of the first heat-transferring device, since it provides a possibility for pressure equalization in particular in connection with the expansion vessel (F).

It is also conceived that in this embodiment, the reactor cooling loop is a loop from the inside of the reactor heat exchanger (3) to the buffer tank (1) formed by the reactor cooling inlet pipe (7) and the communication pipe (8). When the reactor cooling loop is active the communication pipe (8) thus has a different function. Since heat also can be transferred from the active substance to the buffer tank (1) via condensation of the walls of the reactor vessel (2) the reactor vessel (2) in thermal contact with the buffer tank (1) could be considered to be a part of the reactor cooling loop.

This embodiment, where the reactor vessel (2) is inside the buffer tank (1) can also be utilized without the an exhaust gas pipe (10, 11, 12) leading from the burner (A) to a first space at least partially surrounding the volatile liquid reservoir (14) adapted so that heat can be transferred from burner exhaust gas in the first space to the volatile liquid reservoir (14). An advantage is that the volatile liquid in the reactor vessel (2) can condensate on the walls of the reactor vessel (2), which are in thermal contact with the heat-transferring liquid in the buffer tank (1). Heat is released during the condensation, which is then transferred to the liquid in the buffer tank (1). In an alternative aspect there is provided a device where the reactor vessel (2) is inside the buffer tank (1). In such an alternative aspect the device comprises a buffer tank (1), a reactor vessel (2) in thermal contact with the buffer tank (1), wherein an active substance is held inside the reactor vessel (2), a burner (A), a reactor heating loop adapted to transfer heat from the burner (A) to the active substance in the reactor vessel (2), a reactor cooling loop adapted to transfer heat from the active substance in the reactor vessel (2) to the buffer tank (1), a volatile liquid reservoir (14) in fluid contact with the reactor vessel (2), an evaporator (15) in fluid contact with the volatile liquid reservoir (14), a volatile liquid in the enclosed space formed by the reactor vessel (2), the volatile liquid reservoir (14), and the evaporator (15), the volatile liquid is selected together with the active substance so that the volatile liquid has the ability to be absorbed by the active substance at a first temperature and the ability to be desorbed by the active substance at a second higher temperature, wherein at least the buffer tank (1) is at least partially filled with a heat-transferring fluid.

In yet another alternative aspect there is provided an alternative device, which can also be used independently of the exhaust gas pipe (10, 11, 12) to the volatile liquid reservoir. In this other alternative aspect the reactor heating loop comprises a boiler (4) at least partially surrounding the burner (A), a boiler conduit (5, 16) leads from the boiler (4) to the inside of the reactor heat exchanger (3), which is in thermal contact with the active substance applied on the outside of the reactor heat exchanger (3), a burner fluid supply tube (9) leading from the inside of the reactor heat exchanger (3) to the boiler (4), and a communication pipe (8) leading from the burner fluid supply tube (9) to the buffer tank (1), and wherein the reactor cooling loop comprises a reactor cooling inlet pipe (7) leading from the buffer tank (1) via a pump (B) and a valve (E) to the inside of the reactor heat exchanger (3), and the communication pipe (8) leading from the burner fluid supply tube (9) to the buffer tank (1), wherein the enclosed space formed by the buffer tank (1), the boiler (4), the boiler conduit (5, 16), the inside of the reactor heat exchanger (3), a boost pipe (6), the reactor cooling inlet pipe (7), the communication pipe (8), the burner fluid supply tube (9) is at least partially filled with a heat-transferring fluid.

In one embodiment the exhaust gas pipe (10, 11, 12) leads further to a second space at least partially surrounding the evaporator (15) so that heat can be transferred from a hot gas in the second space to the evaporator (15). This has the advantage that the evaporator can be heated. Problems with frost on the outside of the evaporator can be ameliorated.

In one embodiment, the heat-transferring device comprises a valve arrangement (C) on the boiler conduit (5, 16), and a boost pipe (6) leading from the valve arrangement (C) to the buffer tank (1). Such an arrangement is a part of a loop that allows for a boost and defrost mode. The valve arrangement (C) can be controlled so that the heat-transferring fluid reaches the buffer tank (1) instead of the inside of the reactor vessel (3). Then the fluid in the buffer tank (1) can be heated, for instance when the desorption of the reactor is finished. During boost mode, the exhaust gases can still heat for instance the evaporator (15) to provide defrosting. The boost pipe (6) can be very short and is equivalent to an opening from the valve arrangement (C) to the buffer tank (1).

In one embodiment, a part of exhaust gas pipe (10) is in thermal contact with a part of the boiler conduit (5). This allows for improved heat transfer to the heat-transferring liquid in the boiler conduit (5).

In one embodiment, the volatile liquid reservoir (14) is in fluid contact with the reactor vessel (2) via a reactor conduit (13). A reactor conduit (13) allows the reactor vessel (2) to be placed a distance apart from the volatile liquid reservoir (14). In an alternative embodiment, there is no reactor conduit (13) and the volatile liquid reservoir (14) is directly adjacent to the reactor vessel (2). In one embodiment, the reactor vessel (2) is placed under the volatile liquid reservoir (14). It is conceived that the device is to be placed where gravity exerts a force on matter. Thus up and down are defined with respect to the intended placement of the device in the gravity field. Down is intended to be down as shown in the drawings.

In one embodiment, the buffer tank (1) is in fluid contact with an expansion vessel (F). The expansion vessel (F) at least partially absorbs volume changes of the heat-transferring liquid in the buffer tank (1), which are due to for instance temperature variations and generation of gas by heating from the burner (A). In some embodiments, the heat-transferring fluid boils so that gas (steam in case of water) is generated in parts of the system. In such case there is a volume increase in the boiler and possibly also in other parts of the system. In such embodiments the inside of the boiler (4) and reactor heat exchanger (3) are in fluid contact with the buffer tank (1) so that a volume increase is spread to the buffer tank (1) and absorbed by the expansion vessel (F). This is in one embodiment, realized via the communication pipe (8).

In one embodiment, a heat exchanger for domestic hot water (G) is arranged so that it is in thermal contact with a liquid filled in the buffer tank (1). This is a way to provide use of the heat for domestic hot water. In one embodiment, the heat exchanger for domestic hot water (G) has an inlet part for cold water in thermal contact with a lower half of the buffer tank (1) and an outlet part for domestic hot water in thermal contact with an upper half of the buffer tank (1). In general the temperature is lower in the bottom part of the buffer tank (1) compared to the upper part. Hot water has lower density than cold water and thus has a tendency to accumulate in the upper part of the buffer tank (1). The water to be heated enters the heat exchanger (G) in the lower part where the temperature is lower and exits where the temperature is higher in the upper part. This provides a more efficient heating of the domestic hot water. The domestic hot water is in one embodiment, heated in a flow heat exchanger and in one embodiment, this is combined with or replaced with heating in a tank for domestic hot water. A flow heat exchanger does not have any significant amount of hot water stored and thus problems with bacterial growth is reduced or eliminated.

In one embodiment, a heat exchanger for space heating (H) is arranged so that it is in thermal contact with a liquid filled in the buffer tank (1).

In one embodiment, a heat exchanger (I) is arranged so that it is in thermal contact with a liquid filled in the buffer tank (1) and wherein the heat exchanger (I) is connected to at least one of a solar collector and a source of waste heat. This provides the possibility to connect a solar heater to the system so that hot heat-transferring medium from the solar collector can heat a liquid filled in the buffer tank (1).

In one embodiment, the buffer tank (1) is in thermal contact with an electrical heater. Such an additional heater can provide heat as a backup and/or when the need is extraordinary high.

In one embodiment, at least one of the pump (B), the valve arrangement (C), and the valve (E) are arranged outside of the buffer tank (1). Placement outside the buffer tank (1) simplifies service, repair and replacement of the parts.

In one embodiment, the valve arrangement (C) is one selected from a three-way valve and a check valve.

In one embodiment the valve (E) is a check valve. In one embodiment the pump B is not designed to withstand very high temperatures for economic reasons and then the valve (E) protects the pump B from high temperatures.

In one embodiment, the volatile liquid reservoir (14) is inside the buffer tank (1). In an alternative embodiment, the volatile liquid reservoir (14) is outside of the buffer tank (1). In one embodiment, the volatile liquid reservoir (14) is partially inside and partially outside of the buffer tank (1). In one embodiment, there are more than one volatile liquid reservoirs (14), which can be placed outside of or inside of the buffer tank (1), partially inside, or a combination thereof.

In one embodiment, the buffer tank (1) is at least partially provided with thermal insulation from the surrounding.

In one embodiment, the volatile liquid reservoir (14) is at least partially provided with thermal insulation from the surrounding, wherein the insulation is outside of the first space at least partially surrounding the volatile liquid reservoir (14). The insulation should not be an insulation between the gas in the first space and the liquid reservoir (14) and thus any insulation should be outside of the first space. In one embodiment, the volatile liquid reservoir (14) is provided with heat insulation, even if it is placed inside the buffer tank (1).

In one embodiment, the burner (A) is at least one selected from the group consisting of a gas burner, an oil burner, a wood burner, a wood pellet burner, and a coal burner. The burner (A) can burn anything that gives heat. In one embodiment, the burner is adapted to burn at least one from a solid fuel, a liquid fuel and a gaseous fuel. In one embodiment, the burner (A) is adapted to burn an alcohol.

In one embodiment, at least one of the boost pipe (6) and the communication pipe (8) end in an upper half of the buffer tank (1). This gives a higher temperature in the upper half of the buffer tank (1) and a stratification of the heat in the buffer tank (1), which is often desirable.

In one embodiment, the communication pipe (8) comprises a first opening in an upper half of the buffer tank (1) and a second opening in a middle third of the buffer tank (1), wherein valve(s) control the first and second openings. In an alternative embodiment, the second opening is in the lower half of the buffer tank (1). During adsorption phase where heated liquid exits the communication pipe (8) the first opening in the upper half of the buffer tank (1) is often utilized to improve the stratification of the heat in the buffer tank (1). When the absorption phase is initiated, a very hot first stream of heat-transfer fluid is expected to exit from the reactor heat exchanger (3). In one embodiment, this hot fluid is lead out in the first upper opening in the communication pipe (8) to improve the stratification of the heat in the buffer tank (1). As the absorption goes on a gradually decreasing temperature is expected for the heat-transferring fluid exiting the reactor heat exchanger (3). In one embodiment, the heat-transferring fluid is first lead out in the upper first opening in the communication pipe (8) and when the temperature of the heat-transferring fluid is below a certain value the heat transferring fluid is instead lead out through the second lower opening in the communication pipe (8). Alternatively, the first opening in the buffer tank is used for a certain period of time after the absorption phase is started and then the flow is switched to the second lower opening in the communication pipe (8). This improves the stratification of the heat in the buffer tank (1). During boost mode where liquid enters the communication pipe (8), the second lower opening is preferably utilized. Thereby colder liquid is heated during boost mode.

In one embodiment, the reactor cooling inlet pipe (7) comprises an inlet in a lower half of the buffer tank (1). Thereby relatively cold fluid is utilized for the cooling during adsorption phase. This further improves the stratification of the heat, i.e. promotes a heat difference between the upper and the lower of the buffer tank (1).

In one embodiment, the reactor cooling inlet pipe (7) is a pipe arrangement comprising a first inlet in the upper half of the buffer tank (1) and a second inlet in the lower half of the buffer tank (1) and wherein a valve arrangement is adapted for controlling the flow in the first and second inlets. The pipe arrangement is either two pipes and/or one pipe split into two pipes or one pipe with two openings in the lower and upper half respectively. Valves control which opening is open. The upper opening or the lower opening can for instance be open. If all openings are closed, such a valve arrangement can replace the check valve E. The arrangement has an advantage when the heat exchanger is to be cooled. Since warm liquid such as hot water has lower density, it will gather in the upper part of the buffer tank (1). Up is defined in relation to gravity and is in the figures upwards when the text is aligned for reading. When the heat exchanger is to be cooled it is an advantage to begin the cooling with the hottest liquid from the upper half of the buffer tank (1) and then finish the cooling with the coldest liquid from the lower half of the buffer tank (1). This operation is made possible by having this arrangement.

Further, the reactor cooling inlet pipe (7) together with the pump B and the communication pipe (8) give the opportunity to control the stratification of the heat in the buffer tank (1). If it is desired that the temperature in the buffer tank (1) should be roughly equal in the upper and lower halves, the stratification can be lowered by taking liquid from the lower half through the cooling inlet pipe (7) and letting it out in the upper half through the communication pipe (8) by using the pump B.

In one embodiment, the reactor heat exchanger (3) comprises a plurality of heat-transferring members shaped as plates. In one embodiment, a standard plate heat exchanger is used. The plates allow an active substance to be placed on the surfaces of the plates.

In one embodiment, the heat-transferring device comprises a fan (D) arranged to blow surrounding air or gas in the evaporator (15). This improves heat exchange with the surroundings of the evaporator (15). The evaporator (15) can be placed inside or outside of a building where the device is used. If placed outdoors it is an advantage that the exhaust gas also exit outdoors. The main purpose of the fan is to facilitate heat exchange between the evaporator (15) and its surroundings, in one embodiment, however the fan (D) is arranged so that it also can improve the flow of exhaust gas in the pipe (10, 11, 12) when the burner (A) is operated.

In one embodiment, the reactor vessel (2) is provided with heat transferring means on least one selected from the group consisting of at least a part of the outside surface of the reactor vessel (2) and at least a part of the inside surface of the reactor vessel (2). One non-limiting example of heat transferring means are flanges on the outside and/or inside surface of the reactor vessel (2). Such means help to transfer heat from the volatile liquid inside the reactor vessel (2) to the heat transferring fluid in the reactor vessel (1) via the wall of the reactor vessel (2). Inside the reactor vessel (2) the means or flanges should be placed so that a fluid that condenses to liquid on the inner wall of the reactor vessel (2) can flow down via the reactor conduit (13) to the volatile liquid reservoir (14).

In one embodiment, the reactor vessel (2) is provided with at least one tube the inside of which is in fluid contact with the reactor vessel (2) and the tube extending into the buffer tank (1). Such at least one tube in one embodiment, starts in the lower half of the reactor vessel (2) and extends into the buffer tank (1) and exits in the upper half of the reactor vessel (2). Such at least one tube facilitate the heat exchange between the volatile liquid inside the reactor vessel (2) and the heat transferring fluid in the reactor vessel (1) by increasing the surface area. In an alternative embodiment, the surface area of the reactor vessel (2) is increased.

In one embodiment, the reactor conduit (13) is provided with a valve. Such a valve is able to shut down the function of the chemical heat pump. Energy can be stored over a period of time if the valve is shut.

In one embodiment, the active substance is a solid sorbent. A solid sorbent is any substance that has the ability to absorb a volatile liquid. Examples of solid sorbents include but are not limited to salts, oxides, and zeolites.

In one embodiment, the active substance is at least one salt selected from chlorides, chlorates, perchlorates, bromides, iodides, carbonates, and nitrates of lithium, magnesium, calcium, strontium, barium, cobalt, nickel, iron, zinc, manganese, potassium, and aluminium as well as sulphides and hydroxides of lithium, sodium and potassium.

In one embodiment, the active substance is at least one selected from the group consisting of CaO, MgO, CaOH, MgOH, LiCl, LiBr, LiI, $MgCl_2$, $MgBr_2$, $MgI_2$, $Na_2S$, $CaCl_2$, $CaBr_2$, $CaI_2$, $CaCl_2$, and $CaBr_2$. $SrI_2$, KOH, NaOH, $ZnCl_2$, $ZnBr_2$, $ZnI_2$, $AlCl_3$, $AlBr_3$ and $AlI_3$.

In one embodiment, the active substance comprises least one zeolite. Any zeolite can be used, i.e. any microporous aluminosilicate mineral.

In one embodiment, the volatile liquid is at least one selected from the group consisting of water, ammonia, methanol and ethanol.

In one embodiment, the active substance is held in the reactor vessel (2) by a matrix both in solid state, in liquid state, and in solution with the volatile liquid. In solid state, the active substance is also held by the matrix, but not by capillary force since a capillary force is only applicable on a liquid.

In one embodiment, the active substance in the reactor vessel (2) is in the form of particles comprising an inner part and an outer coating, said inner part comprises at least one selected from the group consisting of a salt, MgO, and CaO and said outer coating comprises hydrophobic nanoparticles, wherein the particle has an average size from 1 to 1000 µm, and wherein the nanoparticles have an average size from 1-100 nm.

In one embodiment, the buffer tank (1) is divided into at least two zones in fluid contact with each other, wherein an organ divides the at least two zones and is adapted to counteracting convection in the buffer tank (1). A non-limiting example of such an organ is a wall perforated with a plurality of holes. Another non-limiting example is a non-perforated wall with at least one opening. This improves the stratification of the heat in the buffer tank. It is often desirable to be able to provide heat with different temperatures. For a system to be used in a household it would be possible to provide domestic hot water which at least intermittently reaches at least 60° C. so that for instance growth of legionella bacterial can be supressed. It is further possible to provide heat at lower temperature for a floor heating system for instance at 30-40° C. At the same time, it is possible to provide a slightly higher temperature for space heating with radiators at for instance 40-50° C. This can be achieved by having two or more different volumes in the buffer tank (1) in fluid contact with each other. In one embodiment, there is one upper zone, one middle zone and one lower zone in the buffer tank (1). In an alternative embodiment, there is one upper zone and one lower zone in the buffer tank (1).

It is intended that the enclosed space formed by the buffer tank (1), the boiler (4), the boiler conduit (5, 16), the inside of the reactor heat exchanger (3), the boost pipe (6), the reactor cooling inlet pipe (7), the communication pipe (8), the burner fluid supply tube (9) is at least partially filled with a heat-transferring fluid. The heat-transferring fluid has the function to help transferring heat from the burner (A) to the desired parts of the device. The heat-transferring fluid further has the function to help transferring heat from the reactor heat exchanger (3) to the buffer tank (1). In one embodiment, the heat-transferring fluid comprises water, optionally with an anti freeze additive and optionally with an anti corrosion additive. In one embodiment, the heat-transferring fluid is water.

In one embodiment there is at least one opening in the burner fluid supply tube (9) so that it is in fluid communication with the inside of the buffer tank (1), and wherein the opening is lower than the point where the communication pipe (8) is connected to the burner fluid supply tube (9).

Lower is defined in relation to gravity and the direction, which the device is intended to be operated. The device should be made so that a liquid is able to flow by gravity from the inside of the reactor heat exchanger (3) through the burner fluid supply tube (9) to the boiler (4) at least partially surrounding the burner (A). By using such an additional opening so that there is another fluid contact between the burner fluid supply tube (9) and the buffer tank (1), there is a protection against dry boiling in the boiler (4). During desorption of the active substance the burner is active and in one embodiment steam is generated flowing to the inside of the reactor heat exchanger (3). When the desorption is complete or near complete steam will reach the burner fluid supply tube (9) and will find its way through the communication pipe (8). At the same time, liquid from the buffer tank (1) will flow through the opening into the burner fluid supply tube (9) and further to the boiler (4) so that dry boiling will not occur in the boiler (4).

In one embodiment, the opening in the burner fluid supply tube is a tube leading from the burner fluid supply tube (9) to the buffer tank (1). In this embodiment, there are two tubes from the burner fluid supply tube (9) to the buffer tank (1). One is the communication pipe (8) and there is a further tube at a lower point on the burner fluid supply tube (9).

In one embodiment the communication pipe (8) has a diameter and length which are adapted so that simultaneous transport of water from the buffer tank (1) into the burner fluid supply tube (9) and transport of steam from the burner fluid supply tube (9) to the buffer tank (1) is possible. This is an alternative to two pipes. A skilled person can choose a wide pipe so that steam can exit the burner fluid supply tube (9) while liquid can enter the burner fluid supply tube (9) and reach the boiler (4).

If two or more pipes are arranged between the burner fluid supply tube (9) and the buffer tank (1) or if a wide pipe or opening is between the burner fluid supply tube (9) and the buffer tank (1), then the valve arrangement C is not necessary. Steam or heated fluid can instead exit into the buffer tank (1) through the communication pipe (8). If the valve arrangement C is omitted, then a check valve C is preferably arranged so that liquid cannot flow from the boiler conduit (16) in the reverse direction to the boiler (4). The forward direction in the boiler conduit (16) is indicated with an arrow in FIG. 1.

In a second aspect there is provided a method of operating the heat-transferring device as described above, wherein the device is operated in one of the following phases
- a) desorption phase wherein the burner heats the active substance via the reactor heating loop causing the volatile liquid to desorb from the active substance, the volatile liquid at least partially condensates on the walls of the reactor vessel (2) thereby heating the buffer tank (1) and the volatile liquid flows by gravity to the volatile liquid reservoir (14), and the evaporator (15), exhaust gas from the burner (A) reaches a first space at least partially surrounding the volatile liquid reservoir (14), where it provides heat counteracting condensation in the volatile liquid reservoir (14),
- b) adsorption phase wherein the burner is off, wherein the volatile liquid evaporates from the evaporator (15) and reaches the active substance in the reactor vessel (2) whereby heat is generated, whereby heat is transferred by the reactor cooling loop from the active substance to the buffer tank (1).

It is intended that the device is to be operated in one of the phases at a time. Typically, adsorption phase is followed by desorption phase in an alternating way as usual for chemical heat pumps.

The heating of the volatile liquid reservoir (14) gives that the condensation to a large extent takes place on the walls of the reactor vessel (2) causing the heat to be released there instead of in the volatile liquid reservoir (14).

Figure 2:
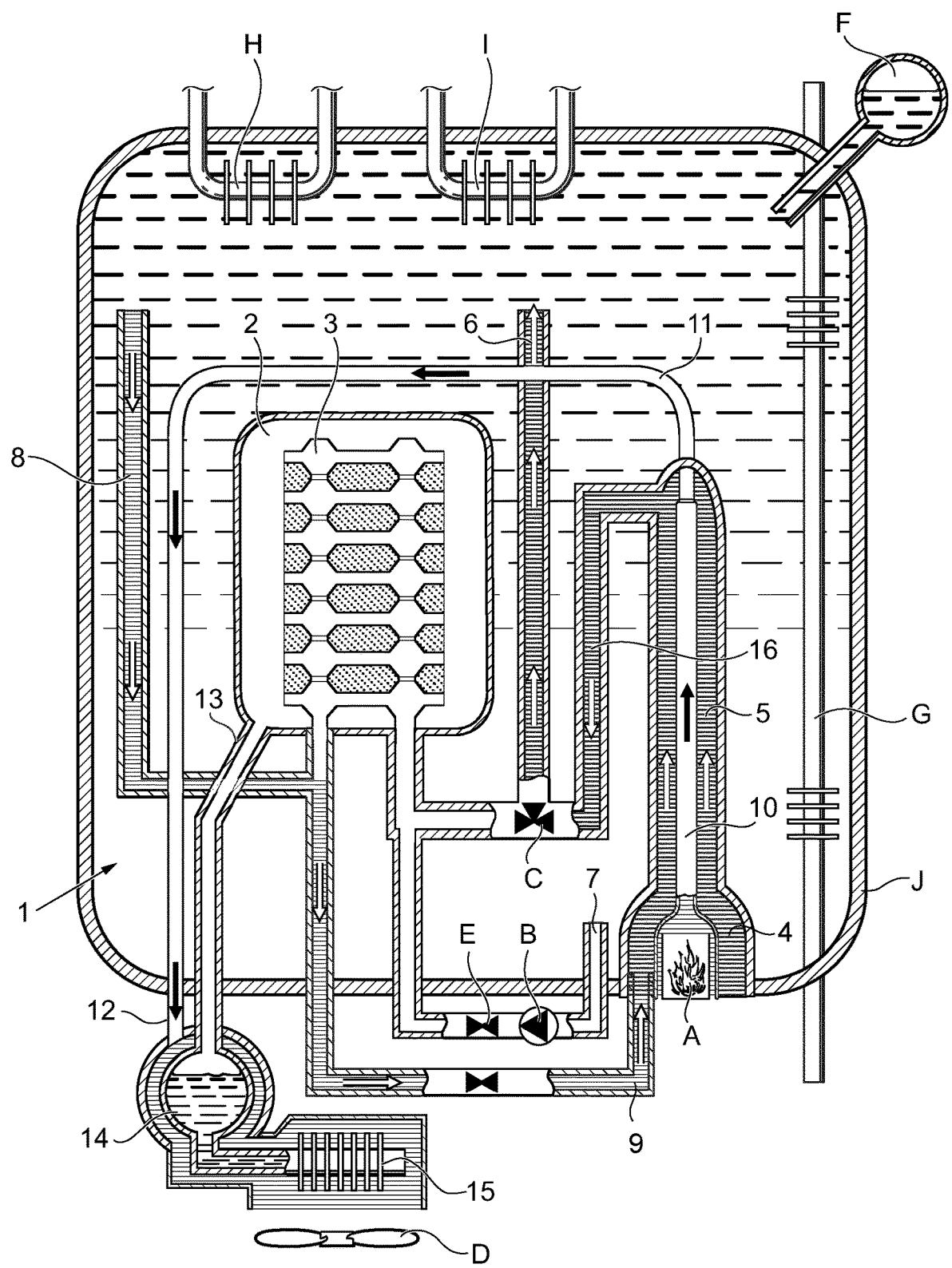
Figure 3:
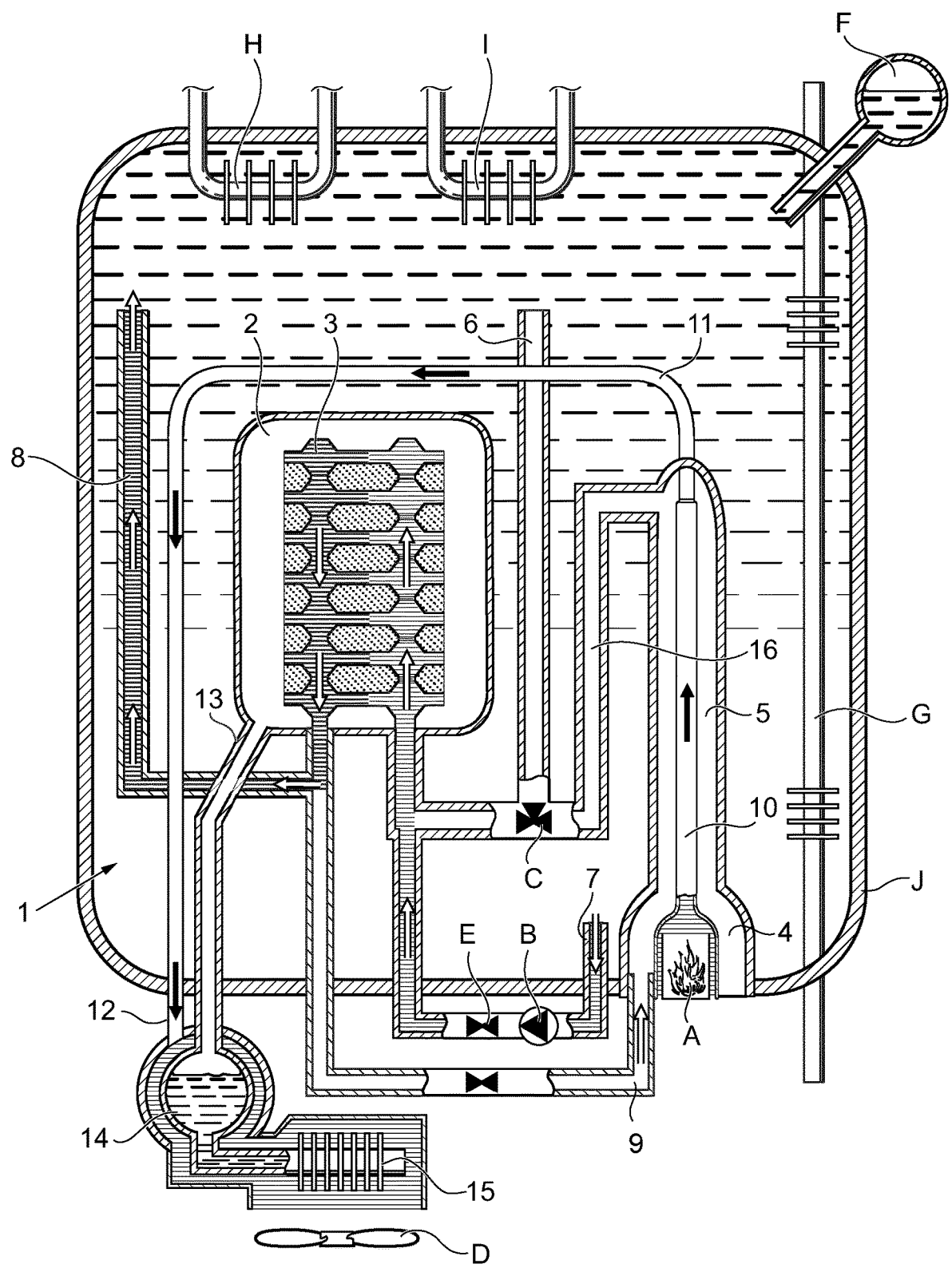
FIG. 3 shows the same embodiment, as in FIG. 1 during absorption phase. The burner is switched off in FIG. 3 as opposed to FIGS. 1 and 2. The different operation phases are further explained in the text.

In one embodiment, where there is a valve arrangement (C) on the boiler conduit (5, 16), and a boost pipe (6) leading from the valve arrangement (C) to the buffer tank (1) the device can be operated in different modes, it can be operated also in a boost mode. In such an embodiment, the device is operated in one of the following phases determined by valves C, E and the pump B as well as the burner (A):
- a) desorption phase wherein the burner heats a heat-transferring fluid in the boiler (4), and optionally in a part of the boiler conduit (5), thereby creating a flow of heated heat-transferring fluid to the inside of the reactor heat exchanger (3) where heat is transferred to the active substance on the outside of the reactor heat exchanger (3), the heating of the active substance cause a volatile liquid to desorb from the active substance, the volatile liquid at least partially condensates on the walls of the reactor vessel (2) thereby heating the buffer tank (1) and the volatile liquid flows by gravity to the volatile liquid reservoir (14), and the evaporator (15), the heat-transferring fluid flowing from the reactor heat exchanger (3) back to the boiler (4) via the burner fluid supply tube (9), exhaust gas from the burner (A) reaches the first space surrounding the volatile liquid reservoir (14), where it counteracts condensation in the volatile liquid reservoir (14), and wherein exhaust gas from the burner (A) reaches the second space surrounding the evaporator (15), where it provides heat for defrosting the evaporator, (this phase is depicted in FIG. 1)
- b) boost mode wherein the burner (A) heats a heat-transferring fluid in the boiler (4), and optionally in a part of the boiler conduit (5), thereby creating a flow of heated heat-transferring fluid to the buffer tank (1) via the boost pipe (6), whereby heat-transferring fluid flows back from the buffer tank (1) to the boiler (4) through the communication pipe (8) and the burner fluid supply tube (9), exhaust gas from the burner (A) reaches a surrounding of the evaporator (15), where it provides heat for defrosting the evaporator, (this mode is depicted in FIG. 2)
- c) adsorption phase wherein the burner is off, wherein the volatile liquid evaporates from the evaporator (15) and reaches the active substance on the outside of the reactor heat exchanger (3) via the reactor conduit (13) whereby heat is generated, heating the heat-transferring fluid which is pumped in to the reactor heat exchanger (3) by the pump (B) through the reactor cooling inlet pipe (7) and wherein the heated heat-transferring fluid flows out of the reactor through the communication pipe (8) to the buffer tank (1) (this phase is depicted in FIG. 3).

In one embodiment, heat-transferring fluid in gas phase is generated during desorption phase in the boiler (4), where the heat-transferring fluid in gas phase reaches the reactor heat exchanger (3), and condensates in the reactor heat exchanger (3), whereby the condensate heat-transferring fluid flows from the reactor heat exchanger (3) back to the boiler (4) via the burner fluid supply tube (9). In one embodiment, where the heat-transferring fluid is or comprises water the heat-transferring fluid in gas phase is steam. Generation of heat-transferring fluid in gas phase (steam) which condenses in the reactor heat exchanger (3) has the advantage of giving an even heat distribution in the reactor heat exchanger (3) since the heat-transferring fluid in gas phase has a tendency to condense at the coldest parts of the reactor heat exchanger (3) thereby heating the colder parts more. An embodiment, where heat-transferring fluid in gas phase is generated, i.e. where the heat-transferring fluid boils is suitably combined with a communication pipe (8) and an expansion vessel (F) to accommodate the volume increase of the gas in relation to the fluid. During absorption phase there will not be any gas and the volume of the heat-transferring fluid is then smaller. The expansion vessel (F) should be able to take care of the volume change.

In one embodiment, a fan (D) is operated during adsorption phase. The fan can circulate air or gas around the evaporator (15) to improve the heat exchange with the surroundings, more in detail heat can be transferred from the surroundings to the evaporator. This heat transfer can be improved with a fan (D).

In one embodiment, an additional defrost mode comprises firing the burner (A) and letting the exhaust gases reach the second space surrounding the evaporator (15) where it provides heat for defrosting. The defrost mode can but does not have to be combined with heating of the active substance.

In one embodiment, the pressure in the buffer tank (1) is adapted so that the boiling point of the heat-transferring fluid becomes such that the active substance on the outside of the reactor heat exchanger (3) releases the volatile liquid whereby the volatile liquid condensates on the walls of the reactor vessel (2) in thermal contact with the heat-transferring fluid. It is conceived that the heat-transferring fluid is heated in the boiler and that the heat reaches the active substance where it causes the volatile liquid to be desorbed (released). The volatile liquid should then condense on the walls of the reactor vessel (2). If the pressure (i.e. boiling point) is adjusted properly, the temperature difference between the active substance and the walls of the reactor vessel (2) can be such that the volatile liquid can be desorbed from the active substance and condense on the walls of the reactor vessel in thermal contact with the heat transfer fluid in the buffer tank (1). The condensation releases heat to the heat transfer fluid in the buffer tank (1) without any additional heat-transferring means.

In one embodiment the stratification of a liquid inside the buffer tank (1) is controlled by using an intake and/or an outlet for the liquid, wherein the intake is positioned higher or lower in relation to the outlet. This can be made by for instance a device where the reactor cooling inlet pipe (7) has a first inlet in the upper half of the buffer tank (1) and a second inlet in the lower half of the buffer tank (1) and where a valve arrangement is able to control which inlet is used. Another way of achieving this is to use a device where the burner fluid supply tube (9) has an opening which is lower than the point where the communication (8) pipe is connected so that for instance heated liquid or steam can be transferred to the upper part of the buffer tank. Yet another way is to use a device with a boost pipe (6). Also any combinations of the above methods can be used. Liquid can thus be taken from the upper part which generally is warmer or the lower half which generally is cooler and thereby control the stratification of the liquid in the buffer tank (1). Liquid can also be delivered to the upper part of the lower part to control the stratification as desired. By stratification is meant the temperature difference between liquid in the upper part and the lower part of the buffer tank (1).

In one embodiment the pump (B) is at least during a period of time operated at the same time as the burner is operated. Then hot fluid heated by the burner is mixed with colder liquid taken through the pipe (7) and this mixture is fed to the inside of the reactor heat exchanger (3).

The invention claimed is:

1. A heat-transferring device comprising:
a buffer tank,
a reactor vessel in thermal contact with the buffer tank, wherein an active substance is held inside the reactor vessel,
a burner,
a reactor heating loop adapted to transfer heat from the burner to the active substance in the reactor vessel,
a reactor cooling loop adapted to transfer heat from the active substance in the reactor vessel to the buffer tank,
a volatile liquid reservoir in fluid contact with the reactor vessel,
an evaporator in fluid contact with the volatile liquid reservoir,
a volatile liquid in an enclosed space formed by the reactor vessel, the volatile liquid reservoir, and the evaporator, the volatile liquid is selected together with the active substance so that the volatile liquid has the ability to be absorbed by the active substance at a first temperature and the ability to be desorbed by the active substance at a second higher temperature,
an exhaust gas pipe leading from the burner to a first space at least partially surrounding the volatile liquid reservoir adapted so that heat can be transferred from burner exhaust gas in the first space to the volatile liquid reservoir,
a reactor heat exchanger inside the reactor vessel, the reactor heat exchanger having an inside and an outside, wherein the active substance is at least partially applied on the outside of the reactor heat exchanger,
the reactor heating loop comprises a boiler at least partially surrounding the burner, a boiler conduit leads from the boiler to the inside of the reactor heat exchanger, which is in thermal contact with the active substance applied on the outside of the reactor heat exchanger, a burner fluid supply tube leading from the inside of the reactor heat exchanger to the boiler, and a communication pipe leading from the burner fluid supply tube to the buffer tank,
the reactor cooling loop comprises a reactor cooling inlet pipe leading from the buffer tank via a pump and a valve to the inside of the reactor heat exchanger, and the communication pipe leading from the burner fluid supply tube to the buffer tank,
wherein an enclosed space formed by the buffer tank, the boiler, the boiler conduit, the inside of the reactor heat exchanger, the reactor cooling inlet pipe, the communication pipe, and the burner fluid supply tube is at least partially filled with a heat-transferring fluid,
the exhaust gas pipe is at least partially in thermal contact with the buffer tank.

2. The heat-transferring device according to claim 1, wherein the exhaust gas pipe leads further to a second space at least partially surrounding the evaporator so that heat can be transferred from a hot gas in the second space to the evaporator.

3. The heat-transferring device according to claim 1, wherein the exhaust gas pipe is in thermal contact with a brine circuit, said brine circuit is further in thermal contact with surrounding air and the evaporator.

4. The heat-transferring device according to claim 1, comprising a valve arrangement on the boiler conduit, and a boost pipe leading from the valve arrangement to the buffer tank.

5. The heat-transferring device according to claim 1, wherein the exhaust gas pipe is in thermal contact with a part of the boiler conduit.

6. The heat-transferring device according to claim 1, wherein a part of the exhaust gas pipe is in thermal contact with the buffer tank in an upper half of the buffer tank.

7. The heat-transferring device according to claim 1, wherein the reactor cooling inlet pipe is a pipe arrangement comprising a first inlet in an upper half of the buffer tank and a second inlet in a lower half of the buffer tank and wherein a valve arrangement is adapted for controlling a flow in the first and second inlets.

8. The heat-transferring device according to claim 1, wherein there is at least one opening in the burner fluid supply tube so that it is in fluid communication with the inside of the buffer tank, and wherein the at least one opening is lower than a point where the communication pipe is connected to the burner fluid supply tube.

9. A method of operating the heat-transferring device according to claim 1, wherein the heat-transferring device is operated in one of the following phases
- a desorption phase wherein the burner heats the active substance via the reactor heating loop causing the volatile liquid to desorb from the active substance, the volatile liquid at least partially condensates on walls of the reactor vessel thereby heating the buffer tank and the volatile liquid flows by gravity to the volatile liquid reservoir, and the evaporator, exhaust gas from the burner reaches the first space at least partially surrounding the volatile liquid reservoir, where it provides heat counteracting condensation in the volatile liquid reservoir,
- an adsorption phase wherein the burner is off, wherein the volatile liquid evaporates from the evaporator and reaches the active substance in the reactor vessel whereby heat is generated, whereby heat is transferred by the reactor cooling loop from the active substance to the buffer tank.

10. The method according to claim 9, wherein the heat-transferring device comprises a valve arrangement on the boiler conduit, and a boost pipe leading from the valve arrangement to the buffer tank wherein the heat-transferring device is operated in one of the following phases determined by the valves and the pump as well as the burner:
- a desorption phase wherein the burner heats the heat-transferring fluid in the boiler, thereby creating a flow of heated heat-transferring fluid to the inside of the reactor heat exchanger where heat is transferred to the active substance on the outside of the reactor heat exchanger, the heating of the active substance cause the volatile liquid to desorb from the active substance, the volatile liquid at least partially condensates on the walls of the reactor vessel thereby heating the buffer tank and the volatile liquid flows by gravity to the volatile liquid reservoir, and the evaporator, the heat-transferring fluid flowing from the reactor heat exchanger back to the boiler via the burner fluid supply tube, the exhaust gas from the burner reaches the first space surrounding the volatile liquid reservoir, where it counteracts condensation in the volatile liquid reservoir, and wherein the exhaust gas from the burner reaches the second space surrounding the evaporator, where it provides heat for defrosting the evaporator,
- a boost mode wherein the burner heats the heat-transferring fluid in the boiler, thereby creating a flow of heated heat-transferring fluid to the buffer tank via the boost pipe, whereby heat-transferring fluid flows back from the buffer tank to the boiler through the communication pipe and the burner fluid supply tube, the exhaust gas from the burner reaches a surrounding of the evaporator, where it provides heat for defrosting the evaporator,
- an adsorption phase wherein the burner is off, wherein the volatile liquid evaporates from the evaporator and reaches the active substance on the outside of the reactor heat exchanger via a reactor conduit whereby heat is generated, heating the heat-transferring fluid which is pumped in to the reactor heat exchanger by the pump through the reactor cooling inlet pipe and wherein the heated heat-transferring fluid flows out of the reactor through the communication pipe to the buffer tank.

11. The method according to claim 9, wherein heat-transferring fluid in gas phase is generated during desorption phase in the boiler, where the heat-transferring fluid in gas phase reaches the reactor heat exchanger, and condensates in the reactor heat exchanger, whereby the condensate heat-transferring fluid flows from the reactor heat exchanger back to the boiler via the burner fluid supply tube.

12. The method according to claim 9, wherein an additional defrost mode comprises firing the burner and letting the exhaust gas reach the second space surrounding the evaporator where it provides heat for defrosting.

13. The method according to claim 9, wherein a pressure in the buffer tank is adapted so that a boiling point of the heat-transferring fluid becomes such that the active substance releases the volatile liquid whereby the volatile liquid condensates on the walls of the reactor vessel in thermal contact with the heat-transferring fluid.

14. The method according to claim 9, wherein a stratification of a liquid inside the buffer tank is controlled by using an intake and/or an outlet for the liquid, wherein the intake is positioned higher or lower in relation to the outlet.

15. The method according to claim 9, wherein the pump at least during a period of time is operated at a same time as the burner is operated.

* * * * *